United States Patent
Huang et al.

(10) Patent No.: US 11,312,581 B2
(45) Date of Patent: Apr. 26, 2022

(54) OBJECT GRASP SYSTEM AND METHOD

(71) Applicant: ABB Schweiz AG, Baden (CH)

(72) Inventors: Jinmiao Huang, Chongqing (CN);
Sangeun Choi, Simsbury, CT (US);
Carlos Martinez, South Windsor, CT (US)

(73) Assignee: ABB Schweiz AG, Baden (CH)

( * ) Notice: Subject to any disclaimer, the term of this patent is extended or adjusted under 35 U.S.C. 154(b) by 258 days.

(21) Appl. No.: 16/385,592

(22) Filed: Apr. 16, 2019

(65) Prior Publication Data

US 2020/0331709 A1    Oct. 22, 2020

(51) Int. Cl.
*B65G 47/90*    (2006.01)

(52) U.S. Cl.
CPC ...... *B65G 47/905* (2013.01); *B65G 2203/041* (2013.01)

(58) Field of Classification Search
CPC .......................... B65G 47/905; B65G 2203/041
USPC ........................................................... 700/230
See application file for complete search history.

(56) References Cited

U.S. PATENT DOCUMENTS

| | | | | |
|---|---|---|---|---|
| 7,878,075 B2* | 2/2011 | Johansson | .............. | B25J 13/084 73/862.046 |
| 8,355,816 B2* | 1/2013 | Saito | ...................... | B25J 9/1697 700/253 |
| 9,498,887 B1* | 11/2016 | Zevenbergen | ....... | B65G 47/918 |
| 10,549,928 B1* | 2/2020 | Chavez | ................. | B65G 47/905 |
| 10,843,878 B2* | 11/2020 | Ukisu | ................... | B65G 47/917 |
| 10,902,377 B2* | 1/2021 | Murphy | ............. | G06K 17/0022 |
| 2007/0227267 A1* | 10/2007 | Loeb | ....................... | B25J 13/084 73/862.046 |
| 2013/0238128 A1* | 9/2013 | Suzuki | .................... | B25J 9/1669 700/258 |
| 2016/0016311 A1* | 1/2016 | Konolige | ............... | B25J 9/1612 700/245 |
| 2016/0075031 A1* | 3/2016 | Gotou | .................... | B25J 9/1697 700/259 |
| 2016/0137435 A1* | 5/2016 | Tanaka | ..................... | B25J 9/023 414/564 |
| 2020/0306986 A1* | 10/2020 | Keraly | .................... | B25J 19/02 |

OTHER PUBLICATIONS

Johns et al., "Deep learning a grasp function for grasping under gripper pose uncertainty," *2016 IEEE/RSJ International Conference on Intelligent Robots and Systems (IROS)*, IEEE, 8 pp. (2016).

Pinto et al., "Supervision via competition: Robot adversaries for learning tasks," *2017 IEEE International Conference on Robotics and Automation (ICRA)*, IEEE, 8 pp. (2017).

* cited by examiner

*Primary Examiner* — Michael Collins
(74) *Attorney, Agent, or Firm* — Leydig, Voit & Mayer, Ltd.

(57) ABSTRACT

A grasping system includes a robotic arm having a gripper. A fixed sensor monitors a grasp area and an onboard sensor moves with the gripper also monitors the area. A controller receives information indicative of a position of an object to be grasped and operates the robotic arm to bring the gripper into a grasp position adjacent the object based on information provided by the fixed sensor. The controller is also programmed to operate the gripper to grasp the object in response to information provided by the first onboard sensor.

8 Claims, 4 Drawing Sheets

OBJECT GRASP SYSTEM AND METHOD

FIELD OF THE DISCLOSURE

The present disclosure relates to automated manufacturing processes and, more specifically, to a system and method for grasping objects.

BACKGROUND OF THE DISCLOSURE

Certain manufacturing processes involve object picking, for example, from a pallet, an endless conveyor, or the like, for sorting and/or processing of the object. The picking itself may be carried out by a picker such as a magnetic or pneumatic device, a gripper, or similar structures. When a picking process is performed, care is taken to effect an efficient grip of the object so as to achieve a predicable object position and orientation, and also to avoid damage to the object.

Various systems and methods have been used in the past to improve the picking process for an object. For example, one previously proposed system includes using a data-driven methodologies, such as deep learning, to improve grasping performance. In such a system, an offline data collection or calibration session is used to determine optimal grasping locations on the object, which will provide a stable grasp without causing damage or deformation to the object being picked. However, there are at least three problems with such a methodology: (a) since each object can be grasped in multiple ways, manual labeling of grasp locations is exhaustive and time-consuming, and therefore, is not a trivial task; (b) human labeling is biased by semantics; and (c) the calibration or labelling achieved for a particular object is not scalable to different type of objects.

While there have been attempts to generate the grasp labels automatically by conducting trial-and-error experiments, either from real robot grasping or from a simulated environment, existing systems and methodology only use sensors to measure success/failure, which makes the learner prone to over-fitting and providing weak supervision at unstable grasping positions. Thus, while a pre-calibrated object grasping strategy may provide a marginal improvement over an open-ended picking strategy, it requires considerable work before it can be implemented and lacks flexibility to application on many different object shapes and sizes.

BRIEF SUMMARY OF THE DISCLOSURE

In one aspect, the present disclosure describes an object grasp system. The system includes a robotic arm assembly having a distal end, which is selectively moveable by the robotic arm with respect to a fixed frame. A gripper is disposed on the distal end and adapted to grasp an object located in an area. A fixed sensor is disposed to monitor the area and is positioned in a stationary fashion relative to the fixed frame. A first onboard sensor is disposed to move with the gripper on the distal end of the robotic arm, the first onboard sensor being disposed to monitor the area. A controller is operably associated with the robotic arm assembly and the gripper, and operates to control the operation of the robotic arm assembly and the gripper. The controller is also operably associated with the fixed sensor and the first onboard sensor, and is disposed to receive information therefrom indicative of a position of the object and the gripper with respect to the fixed frame, and also a position of the object relative to the gripper. The controller is programmed to operate the robotic arm assembly to bring the gripper into a grasp position adjacent the object based on information provided by the fixed sensor. The controller is also programmed to operate the gripper to grasp the object in response to information provided by the first onboard sensor.

In another aspect, the disclosure describes a method for grasping an object with a gripper disposed on a distal end of a robotic arm assembly. The method includes determining a spatial position of an object relative to a fixed frame of reference using a fixed sensor, determining a position of a gripper attached to a distal end of a robotic arm relative to the object using the fixed sensor, activating the robotic arm to move the gripper into a grasping position relative to a first object, grasping the first object with the gripper, evaluating a quality of the grasp using an onboard sensor associated with the robotic arm, and adjusting the grasping position relative to a second object based on the evaluation of the quality of the grasp of the first object. Adjusting the grasping location is performed automatically by a controller based on information provided by the fixed sensor and the onboard sensor.

In yet another aspect, the disclosure describes a robotic arm having a gripper disposed on a distal end thereof, the robotic arm operating to move the gripper relative to a fixed frame of reference, the gripper adapted to grasp an object disposed in a grasping area that is stationary relative to the fixed frame of reference. The robotic arm further includes a fixed camera disposed to monitor the area, the fixed camera disposed stationary relative to the fixed frame of reference, the fixed camera providing visual information indicative of a position of the object relative to the area. An onboard camera is disposed to move with the gripper on the distal end of the robotic arm. The onboard camera is disposed to monitor the area and provide visual information indicative of a position of the object relative to the gripper. A force/torque sensor is disposed on the gripper between the gripper and the distal end of the robotic arm assembly.

A controller is operably associated with the robotic arm assembly and the gripper. The controller operates to control an operation of the robotic arm and the gripper. The controller is also operably associated with the fixed camera, the onboard camera, and the force/torque sensor, and disposed to receive information therefrom. The information is indicative of a position of the object and the gripper with respect to the fixed frame from the fixed camera, a position of the object relative to the gripper from the onboard camera, and one or more forces and one or more moments present at the distal end by the gripper while the object is grasped by the gripper from the force/torque sensor.

In one embodiment, the controller is programmed to operate the robotic arm assembly to bring the gripper into a grasp position adjacent the object based on information provided by the fixed camera, operate the gripper to grasp the object in response to information provided by the onboard camera, automatically select a grasp location on the object, which is engaged by the gripper, based on the information provided to the controller by the force/torque sensor, and estimate a location of a center of gravity of the object based on the information provided to the controller by the force/torque sensor.

BRIEF DESCRIPTION OF THE SEVERAL VIEWS OF THE DRAWING(S)

DETAILED DESCRIPTION

Figure 1:
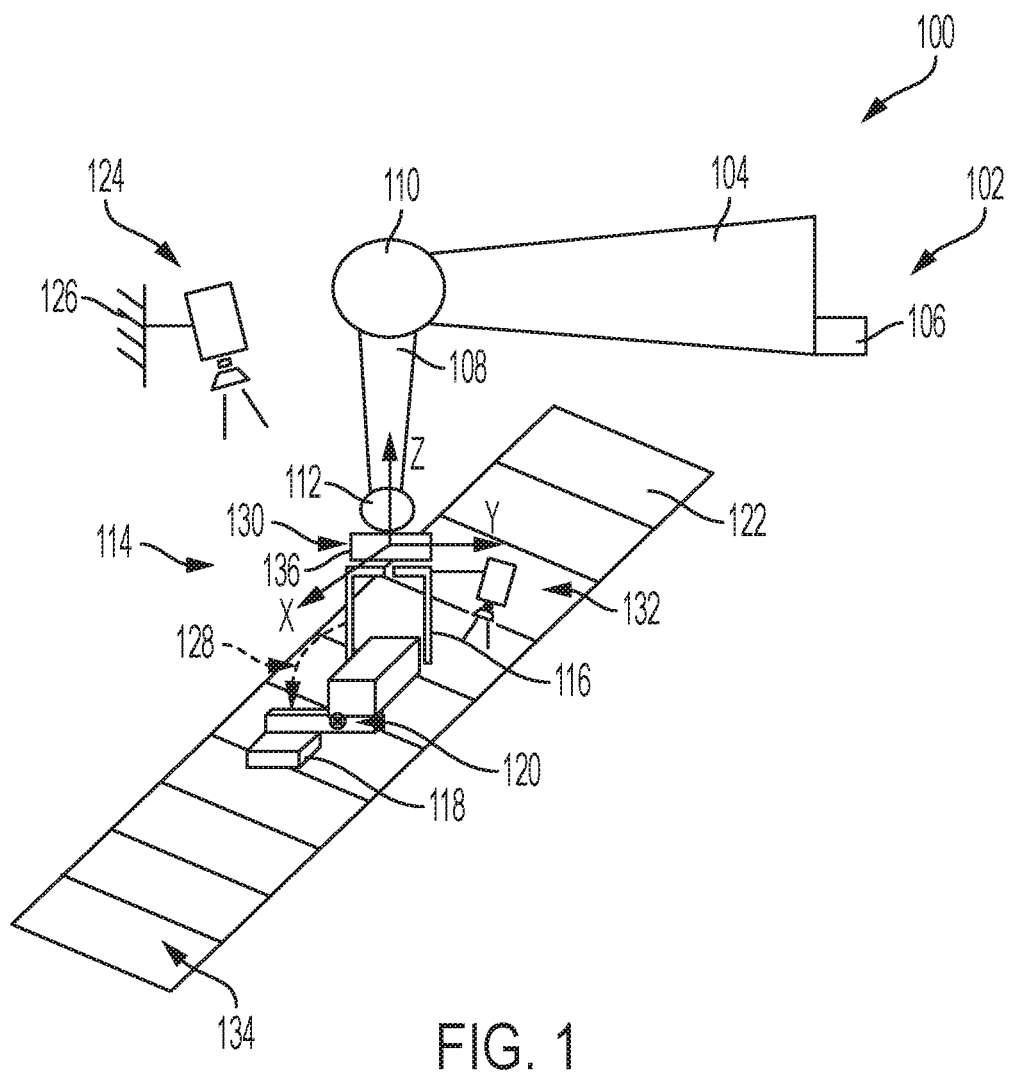
FIG. 1 is schematic diagram of an object picking system in accordance with the disclosure.

The present disclosure generally provides a new system and method for improving the object-picking performance of a picking tool, such as a gripper disposed on a distal or working end of a robotic arm, based on acquisition and processing of signals provided from a plurality of sensors associated with the robot, gripper and/or the environment surrounding a picking location and the object. In one embodiment, the sensors can include tactile sensors, force and torque sensors, vision sensors such as cameras and the like. In an system in accordance with the disclosure, a plurality of sensor inputs provide otherwise isolated information on the object and the robot, which are processed and combined by a controller to effect a customized grasping solution that is improved automatically in real time and that is, over time, adaptable to more than one object and grip configuration.

A system and method in accordance with the disclosure is configured and operates to automatically generate grasp labels by robot trial-and-error with sensor feedback, label grasping locations without the semantic bias commonly introduced by human labeling, optimize the grasping quality in terms of geometric, static and dynamic stability of the object grasped, and rank multiple grasping locations by analyzing sensor data in a discrete fashion. This is accomplished by measuring grip performance using multiple sensors, which may be installed on or off the robotic arm, and which provide signals that are integrated into a singly grasp quality and control system.

In one general aspect, the present disclosure describes a multi-sensor system that operates and is configured to collect a set of data for evaluation of grasp performance during task trial. The sensor system includes a plurality (more than one) sensor, which depending on the application and the type of object being grasped can be selected from a variety of sensors commonly used in the market. Examples of sensors that can be used include cameras, LIDAR, force-torque sensors, tactile sensors, inertial measurement units or sensors, infrared (IR) sensors, and other optical sensors. These and other such sensors can be fixed around the grasping location and/or mounted onto the robot arm. In the present disclosure, the term "fixed" denotes a fixed frame of reference in which the robotic assembly is operating. The robotic assembly may thus be anchored in a stationary (or moveable) fashion with respect to the fixed frame of reference, for example, to a base mounted on a plant floor), and move a tool or gripper disposed on a distal end of the robotic assembly with respect to the fixed frame of reference. In this context, a sensor being mounted on a fixed location can describe sensors mounted anywhere around the area in which the robotic arm assembly is operating.

The various sensor signals, and also the data that those signals contain, are provided to a controller, which is programmed and operates to incorporate a plurality of sensor signals into a unified task, the object of which being top assess the performance of object grasping during each grasping operation, and to adjust, as necessary and in real time, the grasping operation such that one or more grasp quality parameters are iteratively optimized.

To accomplish this for one embodiment, the controller can include a set of rules to map the individual sensory data to evaluate the static performance of grasp such as the object's configuration, including the mass density distribution of the grasped object around or with respect to the gripping structure while it contacts the object. The controller may further include a set of rules to map the individual sensory data to evaluate the dynamic performance of grasps as the object is lifted, moved in a three-dimensional space, or deposited.

Dynamic performance may be qualitatively characterized in the controller in terms of dislocation of the object relative to the gripper, vibration intensity experienced by the object or gripper, slippage, inertial shift, and other parameters. The static and dynamic performance of the grasping operation thus determined may be combined in the controller for each grasping operation such that, after successive grasps, a series of processed and fused data that indicates the representative quality of grasp per trial can be compiled. Adjustments made automatically by the controller after one or more grasping tasks, and their effect in improving the grasping operation, may be learned and implemented for future grasping tasks to achieve an iterative optimization of the grasping operation in general.

In another general aspect, the present disclosure describes a method for improving object pick performance by use of multiple sensor integration to evaluate and improve grasping technique in real time. The dimensions along which optimization is applied to the grasping performance is based on the geometry of the object being grasped, the force required to grasp and stabilize the object during transit, the location of the center of mass of the object relative to a gripping structure, the static and dynamic stability of the grasp, as discussed above, a ranking of one or more grasping locations that have been attempted on the object, and the like. The method may be seeded with an assumed or initial grasping location, center of mass location, mass distribution of the object, and other parameters, each of which is then refined automatically as successive grasping tasks are carried out.

An outline view of one embodiment for a grasping system 100 in accordance with the disclosure is shown in FIG. 1. The grasping system 100, which is partially shown to focus on the salient aspects thereof relative to the present disclosure, includes a robotic arm assembly 102 (partially shown) having first and second arm segments 104 and 108 that are connected to one another by a first joint 110. A second joint 112 disposed at a distal or extreme end of the second arm segment 108 supports a gripper 114, which in the illustrated embodiment includes two gripping jaws 116, but other configurations, devices or number of jaws may be used.

Actuators (now shown) are used in the traditional fashion to move or translate the two arm segments 104 and 108, and also the gripper 114, relative to one another selectively such that the gripper 114 may be moved and positioned at one or more desired locations and orientations in a three dimensional space selectively by a controller 106 associated with the robotic arm assembly 102. In one embodiment, the desired location (along X, Y and Z axes) can be expressed in terms of its coordinates (e.g., its X, Y and Z coordinates), a desired orientation can be expressed by an angular position about each of these three axes, and a desired travel path may include curves or other functions that are followed when travelling from one position to another, in three dimensions.

The controller 106 in the illustrated embodiment is shown schematically and can be positioned on the robotic arm assembly or, as is more typical, as a standalone appliance that is communicatively and otherwise generally operable associated with the robotic arm assembly. The controller 106 can be an electronic controller, which may include programmable logic capability. The controller 106 may be a single controller or may include more than one controller disposed to control various functions and/or features of a of the robotic arm assembly 102 and/or surrounding and associated machines or systems. For example, a master controller, used to control the overall operation and function of a process may be cooperatively implemented with robotic arm controller, used to control the robotic arm assembly 102. In this embodiment, the term "controller" is meant to include one, two, or more controllers that may be associated with the gripper 114 and the robotic arm assembly 102 in general, and that may cooperate in controlling various functions and operations. The functionality of the controller 106, while shown conceptually in the present disclosure, for example, in FIG. 3 discussed below, to include various discrete functions for illustrative purposes only, may be implemented in hardware and/or software without regard to the discrete functionality shown. Accordingly, various interfaces of the controller are described relative to components of the system shown in the block diagram of FIG. 3. Such interfaces are not intended to limit the type and number of components that are connected, nor the number of controllers that are described.

When the grasping system 100 is in use, an object 118 is presented for grasping by the gripper 114. The object 118 has a center of mass 120 and may take on any shape. For example, the object 118 may have a simple geometric shape or a more complex shape that includes walls, cavities or any other shape. Further, depending on the process utilized, the object 118 may be presented in a stationary state for gripping, or may alternatively be in motion when presented for gripping, for example, if the object 118 is carried on an moving, endless conveyor 122 segment, which can include a belt, fixture, platform, or the like, which move the object 118 continuously or intermittently relative to a ground reference point.

The process or steps followed for positioning the gripper 114 relative to the object 118, and the action of grasping the object 118 with the gripper 114, is one aspect of the present disclosure. To accomplish this grasping task, the system 100 includes various sensors that are communicatively connected with the controller 106 and provide information thereto, which the controller 106 receives, processes and uses to determine improvements on a task for grasping the object 118 using the gripper 114.

More specifically, the system 100 includes both onboard and fixed sensors relative to the robotic arm assembly 102. In the exemplary embodiment shown in FIG. 1, fixed sensors include a vision sensor or camera 124 mounted on a solid surface or wall 126 in an area close to a grasping location for the object 118. Additional or different fixed sensors can include proximity sensors for detecting the object 118 as it approaches the gripper 114, speed sensors for detecting a speed and/or acceleration of the conveyor 122, and others. As is further shown in FIG. 1, onboard sensors that are attached and move along with portions of the robotic arm assembly 102 include a tactile sensor 128, a force/torque sensor 130, and a vision sensor or camera 132. Additional or different onboard sensors can also be used and can include targeting sensors, acceleration, vibration, noise, magnetic field and/or other sensors. Both the fixed sensors, for example, the camera 124, and the onboard sensors, for example, the tactile sensor 128, force/torque sensor 130, and the camera 132, have wired or wireless connections with the controller 106 such that, during operation, signals or other indications generated by the sensors are communicated to the controller 106 in real time.

In the embodiment shown, the sensor signals indicate to the controller 106 the position, shape and orientation of the object 118. More particularly, the fixed camera 124 captures image or video information relative to the position and speed of the object 118 as it approaches a grasping area. In the case of a moving conveyor 122 that carries the object into the grasping area, indicia 134 formed on and moving along with the conveyor 122, and the object 118 disposed on the conveyor, can be captured in a video signal by camera 124 that is provided to the controller 106. Based on this information, the controller 106 can create a spatial sequence that identifies the position of the object 118 in real time. The controller 106 can then use this position information to move the gripper 138 into a general position that is close to where the object is, or will be, for carrying out the grasping operation. Images form the camera 124 can also be used to identify an outline of the object, such that an estimation of the mass distribution and, thus, the center of gravity of the object can be made in the controller 106.

Before discussing the function of the onboard sensors, it is worth mentioning that the controller 106 may embody technology that is implemented in hardware and software implementations, and is directed towards detecting the object in an image. In one exemplary implementation, the controller may process image or video feeds and compare successive frames on a frame-by-frame analysis to detect position and motion of the object. Alternatively, the controller may process each frame separately to deduce the location of the object in each frame individually. In general, information from the fixed sensors such as the camera 124 is used to set and track a target that relates to the object, which the controller 106 uses to move the gripper 114 in a desired grasping position.

After the gripper 114 has been properly placed to grasp the object 118, the onboard sensors refine the positioning of the gripper 114 relative to the object 118, and also generate signals indicative of a quality and stability of the object grasp. It is worth noting that placement of the gripper 114 is carried out relative to the object 118 regardless of whether the object is stationary or moving at the speed of the conveyor 122, in which case placement of the gripper 114 will also involve a motion that matches the direction and speed of the object on the conveyor.

In one exemplary and non-limiting embodiment, when the gripper 114 has been placed relative to the object 118, a tactile sensor 128, which includes a sensing whisker in the embodiment shown, may make first contact with the object 118 to confirm that the object 118 is physically present in an expected position. The onboard camera 132, which operates similar to the fixed camera 124, can be used to visually monitor the gripper's approach of the object, and also confirm that the object is of an expected type and shape for grasping. When the object 118 is disposed between the gripping jaws of the gripper 114, the jaws are made to close and thus engage the object 118 therebetween. The grasping force of the jaws, and also the speed and extent of jaw closing are controlled by the controller 106.

With the object 118 engaged in the gripper 114, the robotic arm assembly 102 may lift the object 118 from the conveyor 122. During the lift operation, the force/torque sensor 130 may monitor the weight of the object 118 and also any bending moments the object applies a stem portion of the gripper 114. As can be appreciated, the bending moments will decrease as the center of gravity 120 tends to be aligned and approaches the stem portion of the gripper 114, and will increase the further away from the stem portion of the gripper 114 the center of gravity 120 is.

A location of the center of gravity 120 relative to the object 118, and the distance of the center of gravity 120 from the stem portion 136 in three dimensions, which depends on a grasping location selected by the controller, is a parameter that the controller 106 may determine and optimize upon successive grasps based on the bending moments sensed by the force/torque sensor 130. Moreover, the sensor 130 may also sense vibration in the even the object swings or slips while grasped. All these inputs can be adjusted automatically by the controller automatically to improve the quality of the grasp. For example, the controller may select an incrementally displaced location for grasping the object and observe whether the bending moments are increasing or decreasing between successive grasps. If the moments are increasing, the grasp location selected is further from the center of gravity, in which case the grasping location is again adjusted in the opposite direction. These adjustments can continue and improvements adopted as new grasping location while slippage or shifting of the load carried by the gripper, i.e., the location and orientation of the object relative to the gripper, does not change.

Figure 2:
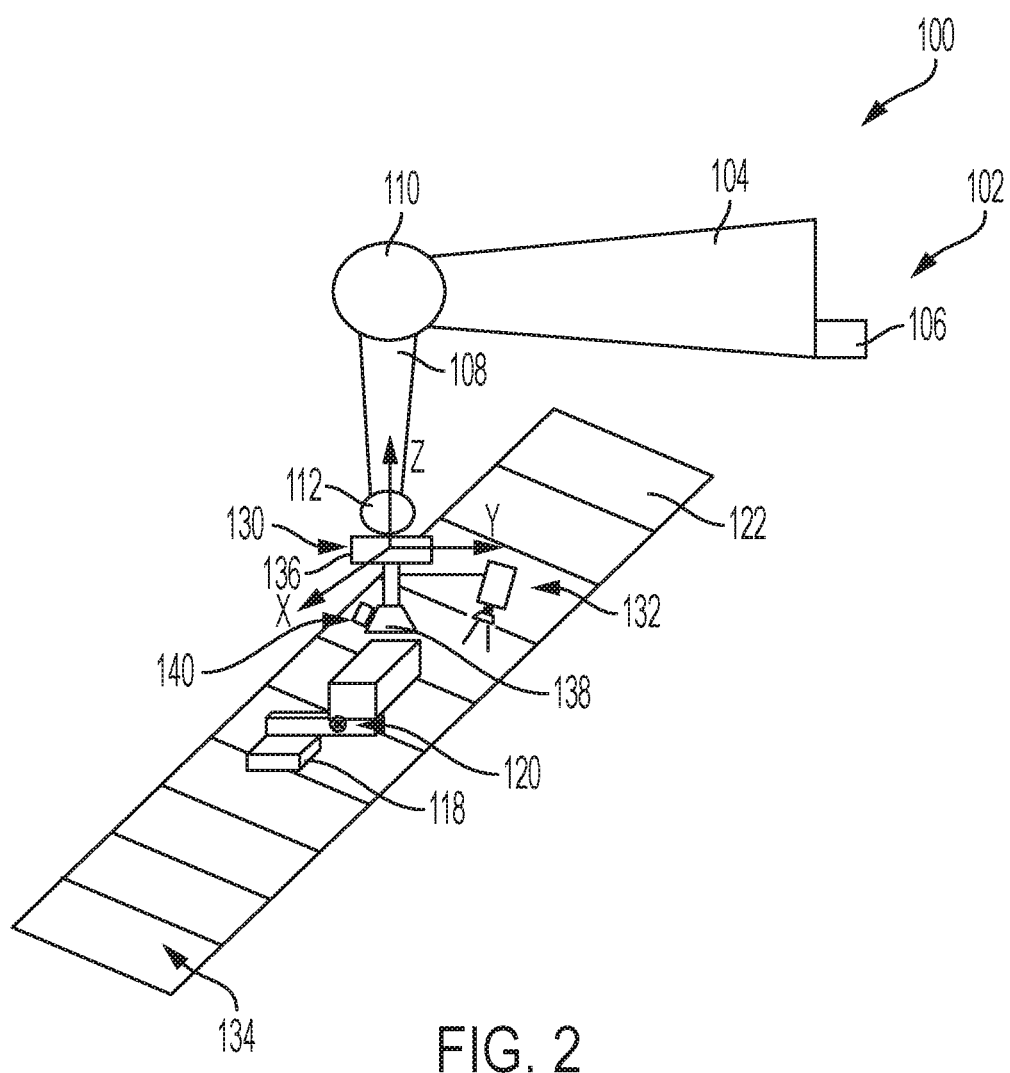
FIG. 2 is a schematic diagram of an object picking system in accordance with the disclosure.

An alternative embodiment for the system 100 is shown in FIG. 2, in which a different gripper configuration and different onboard sensor are used. In this embodiment, structures and features that are the same or similar to corresponding structures and features shown and described relative to the embodiment shown in FIG. 1 are denoted by the same reference numerals previously used for simplicity. In this embodiment, the gripper 138 includes a suction device 138, which can also be embodied alternatively as an electromagnet for picking ferrous metal objects. The suction device 138 may include a cup, from which air is evacuated by a pump (not shown) such that a low pressure or vacuum is created when an open end of the cup is pressed against a surface of the object 118 to engage the object. The size of the cup and the strength of the vacuum can be selected based on the lifting force required to raise and manipulate the object.

While certain sensors such as the onboard camera 132 in the embodiment of FIG. 2 may operate in the same or similar fashion as described previously relative to FIG. 1, additional sensors may be used. For example, when a gripper 138 is used that includes a flexible cup for suction-engagement, as described above, an inertia sensor 140 associated with the suction pad 138 may be used to indicate whether swinging of the object is occurring while the object is engaged on the gripper.

Figure 3:
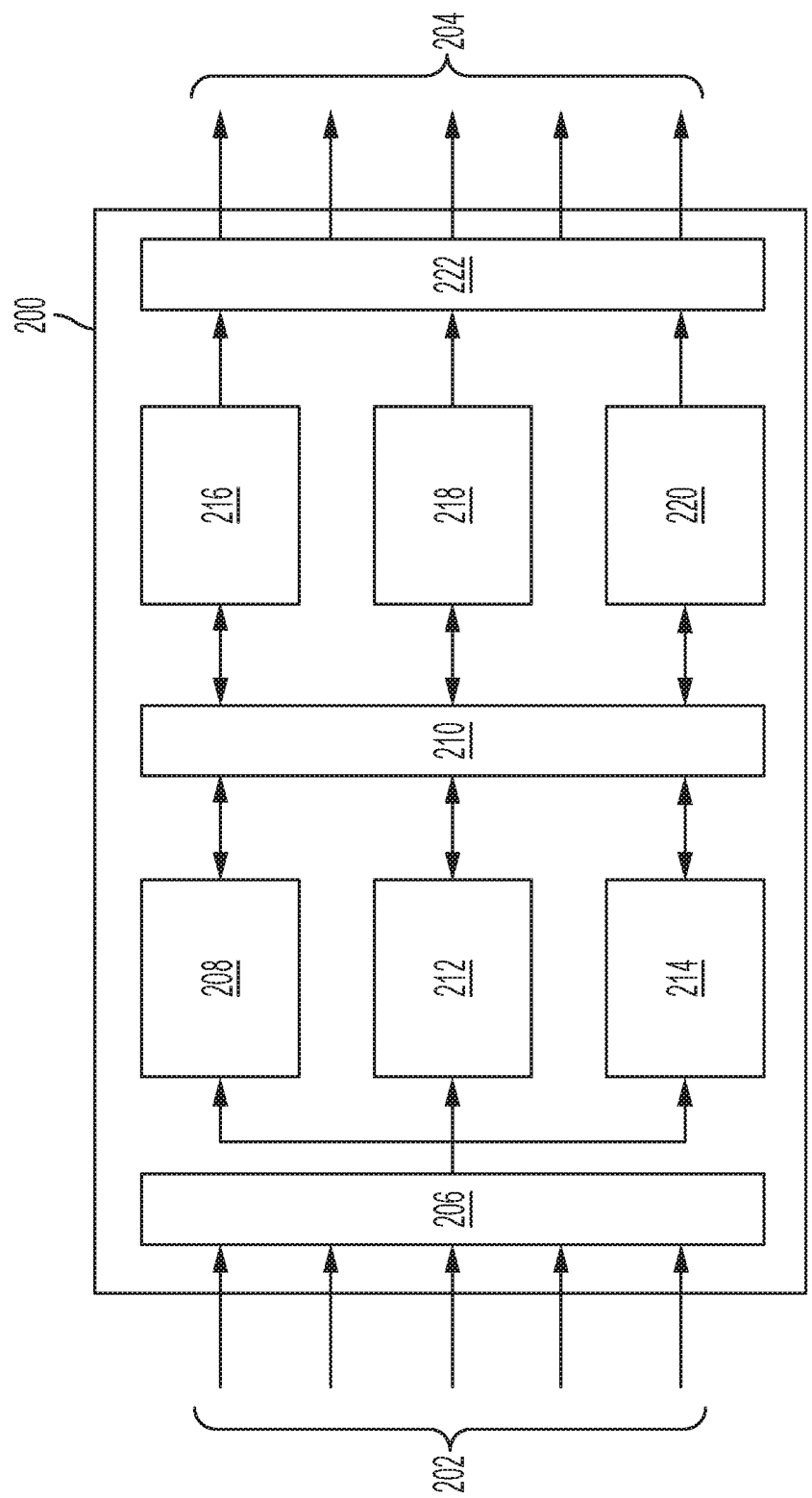
FIG. 3 is a block diagram for a controller in accordance with the disclosure.

A block diagram for a control 200, which may be operating within the controller 106, is shown in FIG. 3. The control 200 may be implemented in hardware or software in the form of computer executable instructions. Basic components and systems such as a processor, memory, communication devices, analog or digital sensor interfaces, and the like, may contribute to or facilitate operation of the control 200 in the typical fashion and are not discussed in detail herein for simplicity.

The control 200 includes a plurality of inputs 202, which represent signals and/or other information provided to the control 200 from the various fixed and onboard sensors that monitor the grasping operation, as discussed above relative to FIGS. 1 and 2. The sensor inputs 202 are processed by the control to ultimately provide a plurality of command signals 204, which are relayed to various actuators in the system 100 that cause the robotic arm assembly 102 and related systems to move and operate when carrying out a task such as a grasping operation. The sensor inputs 202 are provided to a multiplexer 206. Each of the sensor inputs 202 may be provided in a raw form, for example, a video feed, or in a filtered and/or analyzed form, such as information indicative of the location and, if applicable, speed of the object captured in a video feed. The various other sensors may provide similar inputs depending on the parameter being monitored.

The multiplexer 206 combines and distributes the various sensor inputs 202 into one or more sub-controllers that execute various functions. In the illustrated embodiment, the control 200 includes a first sub-controller 208, or a positioning controller, which is tasked with locating the object in a three dimensional space and guiding the gripper into a position where the object may be grasped. Operation of the positional controller 208 may include various discrete functions that process and then carry out various operations based on sensor signals such as the various fixed and/or onboard sensors described relative to the embodiments shown in FIG. 1 and FIG. 2.

More specifically, the positional controller 208 may receive information indicative of the fixed or travelling position of an object, such as the object 118 (FIG. 1), from the cameras 124 and 132, the tactile sensor 128, and/or other sensors. In response, or based on these signals, the positional controller 208 may provide commands 204 to the various actuators moving the various sections of the robotic arm assembly 102 to move the gripper 114 or 138 into a position proximal the object, and commands to activate the gripper, to engage the object 118. During operation, inputs, commands and estimations made by the positional controller 208 may be stored in, or retrieved from, in a memory device 210. The memory device 210 may include preliminary values for various parameters relating to the positioning of the gripper for grasping, which are updated and/or adjusted with every successive grasping operation, or a subset thereof, during operation.

Information from the multiplexer 206 is also provided to a second sub-controller 212, or a grasp label controller, which is tasked with determining a desired position or positions in which an object should be grasped. More specifically, in one embodiment, the grasp label controller 212 cooperates with the positional controller 208 to identify the particular areas of engagement between the gripper 114 or 138 and the object 118. To accomplish this task, the grasp label controller 212 may use predefined or visual information to infer a position of a center of gravity of the object, such that one or more contact areas between the gripper and object can be symmetrically arranged around the center of gravity. Information provided to an updated between the grasp label controller 212 and the memory device 210 may be iteratively updated with one or more successive grasps to arrive to a grasp label that includes locations of gripper contact with the object that are, to the extent possible, as close to an as symmetrically arranged around the center of gravity of the object. For example, based on the shape of the object, the grasp label controller may use visual information such as a picture or video to infer a center of mass of the object to be close to a geometrical center of the object, as determined by the picture. This original assumption may then be refined upon successive grasps based on grasp stability information.

Grasp stability information may be determined in a third sub-controller 214 or stability controller. The stability controller 214 communicates with the positioning controller 208, the grasp label controller 212, and the memory device 210, to adjust as necessary the positioning and location of the gripper interaction with the object to optimize the stability of the grasp over one or more iterative steps performed during successive grasps. More specifically, the stability controller 214 may receive information form the force/torque sensor 130 and/or a vibration or inertial sensor(s) 140 to determine whether the object is stably and securely engaged with the gripper 114 or 138. When it is determined that the grasp is not as stable as desired, for example, when shaking or moving of the grasped object is sensed, the stability controller 214 may store an indication that an adjustment is required, which is then retrieved and utilized by the positional controller 208, to adjust the approach of the object, and the grasp label controller 212, to adjust the grasping locations on the object.

Information relevant to the positioning, grasp label generation and stability of the grasp applied on an object is transmitted or retrieved, for example, from the memory device 210, by a positioning driver 216, a grasp label driver 218, and a stability driver 220. These drivers may be part of or built into an existing robotic arm system, and operate based on the information determined by the sub-controllers 208, 212 and 214 to generate the command signals 204, through a driver device 222, that effect the various operations and adjustments to the motions and operation of the robotic arm assembly 102 during operation. In one embodiment, the drivers 216, 218, and 220 perform a similar function with the sub-controllers 208, 212, and 214, but for a subsequent grasping operation such that any adjustments deemed desired during a last grasp can be implemented.

Accordingly, the positioning driver 216 may receive information for placing and operating the gripper for each successive grasping operation based on the estimations and adjustments that are determined in the three sub-controllers 208, 212 and 214, as previously described. Similarly, the grasp label driver 218 may record and monitor a history of different grasp locations onto a particular object, and adjust various parameters relating thereto such as grasp strength, order of motion for multiple fingers on a gripper, and the like, during operation. The stability driver 220 may operate the various actuators in a certain order and with certain displacement rates based on historical data and iterative adjustments. All these functions can be implemented in learning algorithms, such as a regression algorithm, or may alternatively be coded in fixed computer-executable instructions. Upon completion of a grasping operation, various relevant parameters such as the shape of the object, the location of the object's center of gravity, desired grasping locations on the object, and the like, can be updated in the memory device 210 for use by the sub-controllers 208, 212 and 214.

Figure 4:
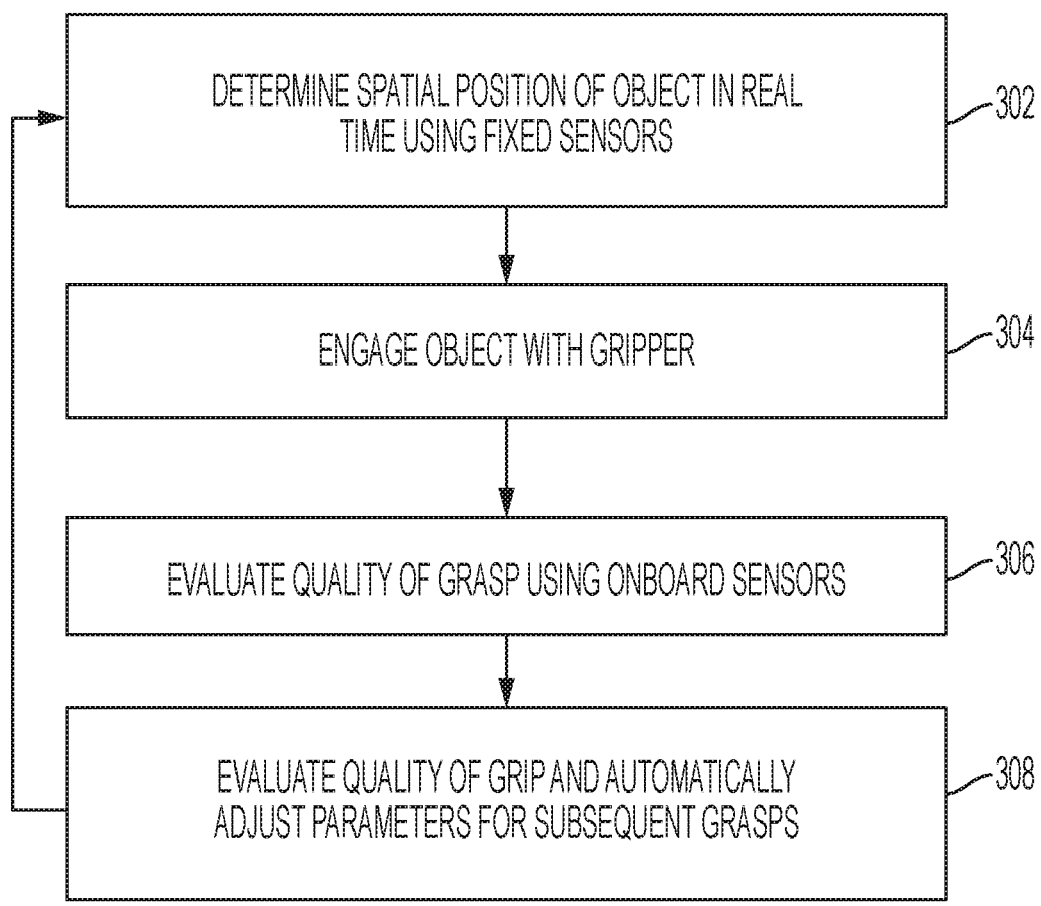
FIG. 4 is a flowchart for a method in accordance with the disclosure.

A flowchart for a method of grasping an object using a gripper associated with a robotic arm assembly is shown in the flowchart of FIG. 4. In accordance with the method, a grasping procedure may include an initial estimation of the location and/or travel speed of an object at 302. As previously described, a determination of a spatial location of an object, in real time, may be carried out by a fixed sensor such as a camera, which collects visual data of the grasped object with respect to a fixed reference frame, and/or with use of a robot-mounted camera, which collects visual data of the object relative to a gripper attached to the robot. The one or multiple camera data may be processed by vision software, which can determine and provide information indicative of location and orientation of the object, in real time and for each grasping operation or trial.

Based on such information, the object is grasped by the gripper at 304, and the quality of the grasp is determined at 306. Various sensors can be used to effect these operations. For example, a tactile sensor can be used to detect physical proximity of the object to the gripper for grasping, and a force-toque sensor can be used to measure gravitational and inertial forces in both translational and orientation coordinate frames. The tactile sensor can detect the object motion relative to the gripper, which may include vibrations, object shifts/dislocations, or impacts. These sensor data are processed by a sensor data processing software for the performance evaluation of object grasps at 304 and 306. Depending on the type of gripper used, for example, a suction pad, a micro-machined inertial measurement unit having a small footprint can be mounted on the suction pad to detect any dynamic displacement and motion of suction pad, which will be translated into the motion of the object relative to the suction gripper. These sensor data will be processed by a sensor data processing software for the performance evaluation of test objects under consideration.

Conclusions concerning the quality of the grasp at 306 and appropriate adjustments for subsequent grasps are implemented in a learning or automatically adjusting algorithm at 308, so that subsequent grasps can be adjusted in order improve grasp quality and reduce undesired effects such as load shifts or vibration, to name a few, of the grasped object during transfer of the object from one location to another by the robotic arm.

The various sensors described in the present disclosure are selected for their ability to provide functional parameters that indicate the quality of a grasp. It should be appreciated however that additional or different sensors may also be used depending on the type of object being grasped and also the type of gripper used. For the embodiments illustrated in FIGS. 1 and 2, for example, the fixed camera 124 may be used to provide filtered images of the object and the robot at different instances. This information can be interpreted, for example, by the positional controller 208, to determine and adjust or optimize a grasp sequence with respect to the motion of the robot and/or operation of the gripper. The performance of this functions can be quantified or indexed to infer a discrete status index of the relative configuration of the robot, the gripper or tool attached to the robot, the work stage, and the object.

Similar to the fixed camera, a mounted camera 132 (FIG. 1) can provide filtered images of the object at different instances, such that the positional and orientational consistency of the object relative to the gripper can be evaluated and monitored. Performance indexes based on this information can include qualitative indexes for securing, translating, rotating, or slipping of the object, and also an inferred proximity of the grasped portion of the object relative to its center of gravity. A force/torque sensor such as the sensor 130 (FIG. 1) can provide force and torque data in three directions to measure the gravitational and torsional stability of the grasped object as it relates to the proximity and orientation of the grasp with respect to the center of gravity of the object. The tactile sensor 128 (FIG. 1) can be used to detect slippage or dislocation of the object relative to the gripper, which can be caused of affected by proximity of the grasp location to the center of gravity and any resulting moments relative to the gripper. The inertial unit 140 (FIG. 2) can be used that includes 3 accelerometers, 1 or 2 gyroscopes, tilt sensors and the like, which can provide indications of the dynamic behavior of the object during a grasp and while the robot is moving.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An object grasp system, comprising:
a robotic arm assembly having a distal end, the distal end being selectively moveable by the robotic arm with respect to a fixed frame;
a gripper disposed on the distal end, the gripper adapted to grasp an object located in an area;
a fixed sensor disposed to monitor the area and positioned in a stationary fashion relative to the fixed frame;
a first onboard sensor disposed to move with the gripper on the distal end of the robotic arm, the first onboard sensor disposed to monitor the area; and
a controller operably associated with the robotic arm assembly and the gripper and operating to control an operation thereof;
the controller further operably associated with the fixed sensor and the first onboard sensor and disposed to receive information therefrom indicative of a position of the object and the gripper with respect to the fixed frame, and also a position of the object relative to the gripper, the controller being programmed to:
operate the robotic arm assembly to bring the gripper into a grasp position adjacent the object based on information provided by the fixed sensor;
operate the gripper to grasp the object in response to information provided by the first onboard sensor; and
further comprising a force/torque sensor disposed on the gripper between the gripper and the distal end of the robotic arm assembly, the force/torque sensor providing information to the controller indicative of one or more forces and one or more moments present at the distal end by the gripper while the object is grasped by the gripper,
wherein the controller is further programmed to automatically select a grasp location on the object, which is engaged by the gripper, based on the information provided to the controller by the force/torque sensor, and
wherein the controller is further programmed to estimate a location of a center of gravity of the object based on the information provided to the controller by the force/torque sensor.

2. The object grasp system of claim 1, wherein the fixed sensor is a camera providing visual information to the controller indicative of a spatial location of the object in a three dimensional space related to the fixed frame.

3. The object grasp system of claim 1, wherein the first onboard sensor is a camera mounted on the distal end of the robotic arm assembly adjacent the gripper, and wherein the first onboard sensor provides visual information to the controller indicative of a position of the object relative to the gripper.

4. The object grasp system of claim 1,
wherein the fixed sensor is a fixed camera providing visual information indicative of a position of the object relative to the area;
wherein the first onboard sensor is an onboard camera providing visual information indicative of a position of the object relative to the gripper; and
wherein the controller is operably associated with the fixed camera, the onboard camera, and the force/torque sensor, the controller disposed to receive information therefrom indicative of:
a position of the object and the gripper with respect to the fixed frame from the fixed camera,
a position of the object relative to the gripper from the onboard camera, and
the controller being further programmed to:
operate the robotic arm assembly to bring the gripper into the grasp position adjacent the object based on information provided by the fixed camera;
operate the gripper to grasp the object in response to information provided by the onboard camera; and
automatically select a grasp location on the object, which is engaged by the gripper, based on the information provided to the controller by the force/torque sensor.

5. The object grasp system of claim 4, further comprising a tactile sensor disposed on the robotic arm adjacent the distal end, the tactile sensor providing information to the controller indicative of a position of the object relative to the gripper, wherein the controller is further programmed to adjust a grasp location on a subsequent object, which was already engaged by the gripper, based on the information provided to the controller by the tactile sensor for a previous object engaged by the gripper.

6. The object grasp system of claim 4, further comprising an inertia sensor disposed on the gripper, the inertia sensor providing information to the controller indicative of a position of the object relative to the gripper, wherein the controller is further programmed to adjust a grasp location on a subsequent object, which was already engaged by the gripper, based on the information provided to the controller by the inertia sensor for a previous object engaged by the gripper.

7. An object grasp system, comprising:
a robotic arm assembly having a distal end, the distal end being selectively moveable by the robotic arm with respect to a fixed frame;
a gripper disposed on the distal end, the gripper adapted to grasp an object located in an area;
a fixed sensor disposed to monitor the area and positioned in a stationary fashion relative to the fixed frame;
a first onboard sensor disposed to move with the gripper on the distal end of the robotic arm, the first onboard sensor disposed to monitor the area; and
a controller operably associated with the robotic arm assembly and the gripper and operating to control an operation thereof;
the controller further operably associated with the fixed sensor and the first onboard sensor and disposed to receive information therefrom indicative of a position of the object and the gripper with respect to the fixed frame, and also a position of the object relative to the gripper, the controller being programmed to:
operate the robotic arm assembly to bring the gripper into a grasp position adjacent the object based on information provided by the fixed sensor;
operate the gripper to grasp the object in response to information provided by the first onboard sensor; and
further comprising a tactile sensor disposed on the robotic arm assembly adjacent the distal end, the tactile sensor providing information to the controller indicative of a position of the object relative to the gripper, wherein the controller is further programmed to adjust a grasp location on a subsequent object, which was already engaged by the gripper, based on the information provided to the controller by the tactile sensor for a previous object engaged by the gripper.

8. An object grasp system, comprising:
a robotic arm assembly having a distal end, the distal end being selectively moveable by the robotic arm with respect to a fixed frame;
a gripper disposed on the distal end, the gripper adapted to grasp an object located in an area;
a fixed sensor disposed to monitor the area and positioned in a stationary fashion relative to the fixed frame;
a first onboard sensor disposed to move with the gripper on the distal end of the robotic arm, the first onboard sensor disposed to monitor the area; and
a controller operably associated with the robotic arm assembly and the gripper and operating to control an operation thereof;
the controller further operably associated with the fixed sensor and the first onboard sensor and disposed to receive information therefrom indicative of a position of the object and the gripper with respect to the fixed frame, and also a position of the object relative to the gripper, the controller being programmed to:
operate the robotic arm assembly to bring the gripper into a grasp position adjacent the object based on information provided by the fixed sensor;
operate the gripper to grasp the object in response to information provided by the first onboard sensor; and
further comprising an inertia sensor disposed on the gripper, the inertia sensor providing information to the controller indicative of a position of the object relative to the gripper, wherein the controller is further programmed to adjust a grasp location on a subsequent object, which was already engaged by the gripper, based on the information provided to the controller by the inertia sensor for a previous object engaged by the gripper.

* * * * *